United States Patent
Raman

(10) Patent No.: US 10,021,016 B2
(45) Date of Patent: *Jul. 10, 2018

(54) VLAN TO SECURE COMMUNICATION BETWEEN VIRTUAL MACHINES AND IN A MULTI-TENANT PUBLIC DATA CENTER

(71) Applicant: Nicira, Inc., Palo Alto, CA (US)

(72) Inventor: Chidambareswaran Raman, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,671

(22) Filed: Feb. 1, 2016

(65) Prior Publication Data

US 2016/0149796 A1 May 26, 2016

Related U.S. Application Data

(63) Continuation of application No. 14/108,277, filed on Dec. 16, 2013, now Pat. No. 9,294,524.

(51) Int. Cl.
*G06F 15/16* (2006.01)
*H04L 12/715* (2013.01)
(Continued)

(52) U.S. Cl.
CPC .......... *H04L 45/04* (2013.01); *G06F 9/45533* (2013.01); *G06F 9/541* (2013.01);
(Continued)

(58) Field of Classification Search
CPC ............. H04L 12/581; H04L 29/06027; H04L 29/08072; H04L 29/06; G06Q 10/10
(Continued)

(56) References Cited

U.S. PATENT DOCUMENTS 6,006,275 A    12/1999   Picazo, Jr. et al.
8,064,469 B2 *  11/2011   Webster .............. H04L 41/0846
                                                370/254
(Continued)

OTHER PUBLICATIONS

Mann, Vijay, Etal., "Crossroads: Seamless VM Mobility Across Data Centers Through Software Defined Networking," IEEE Network Operations and Management Symposium (NOMS), Apr. 16-20, 2012, 9 pages, IEEE, Piscataway, NJ, US.

*Primary Examiner* — Vivek Srivastava
*Assistant Examiner* — Atta Khan
(74) *Attorney, Agent, or Firm* — Adeli LLP

(57) ABSTRACT

A method for creating a set of virtual machines on a public datacenter. The method, from a first network controller of a private network, commands a second network controller of the public datacenter to create the virtual machines. The method, from the first network controller of the private network, communicates with the second network controller of the public datacenter to determine a type of the second network controller. When the first network controller includes instructions for using application programming interfaces (APIs) of the type of the second network controller, the method uses the APIs to set up a VLAN for the set of virtual machines in order to allow the virtual machines of the set of virtual machines to communicate securely with each other without sending the communications through the private network. In some embodiments, the VLAN is a private VLAN (PVLAN).

15 Claims, 9 Drawing Sheets

(51) Int. Cl.
*H04L 29/06* (2006.01)
*G06F 9/455* (2018.01)
*G06F 9/54* (2006.01)
*H04L 12/713* (2013.01)

(52) U.S. Cl.
CPC .......... *H04L 45/586* (2013.01); *H04L 65/403* (2013.01); *G06F 2009/45595* (2013.01)

(58) Field of Classification Search
USPC ........................................................ 709/204
See application file for complete search history.

(56) References Cited

U.S. PATENT DOCUMENTS

| | | | |
|---|---|---|---|
| 8,144,699 B2 * | 3/2012 | Vinneras | H04L 12/4641 370/389 |
| 8,438,654 B1 * | 5/2013 | von Eicken | G06F 21/53 709/217 |
| 8,473,557 B2 * | 6/2013 | Ramakrishnan | G06F 9/4856 709/206 |
| 8,625,603 B1 * | 1/2014 | Ramakrishnan | H04L 12/4641 370/395.3 |
| 8,660,129 B1 | 2/2014 | Brendel et al. | |
| 8,705,513 B2 * | 4/2014 | Van Der Merwe | H04L 47/72 370/351 |
| 8,762,501 B2 | 6/2014 | Kempf et al. | |
| 8,819,678 B2 * | 8/2014 | Tsirkin | G06F 9/45558 709/227 |
| 9,294,524 B2 | 3/2016 | Raman | |
| 2004/0075857 A1 * | 4/2004 | Akiyoshi | G06F 8/61 358/1.13 |
| 2007/0223493 A1 * | 9/2007 | Sridhar | H04L 12/1886 370/395.53 |
| 2009/0063584 A1 * | 3/2009 | Abzarian | G06F 8/71 |
| 2010/0318609 A1 | 12/2010 | Lahiri et al. | |
| 2011/0075674 A1 | 3/2011 | Li et al. | |
| 2011/0142053 A1 * | 6/2011 | Van Der Merwe | H04L 47/72 370/395.1 |
| 2011/0191492 A1 * | 8/2011 | Imai | G06F 15/173 709/238 |
| 2011/0261828 A1 | 10/2011 | Smith | |
| 2011/0283017 A1 | 11/2011 | Alkhatib et al. | |
| 2011/0296052 A1 * | 12/2011 | Guo | G06F 9/5077 709/240 |
| 2012/0099602 A1 | 4/2012 | Nagapudi et al. | |
| 2013/0268799 A1 | 10/2013 | Mestery et al. | |
| 2013/0332619 A1 | 12/2013 | Xie et al. | |
| 2014/0279862 A1 * | 9/2014 | Dietz | H04L 41/0806 707/609 |
| 2014/0325037 A1 | 10/2014 | Elisha | |
| 2015/0169386 A1 * | 6/2015 | Gopalraj | G06F 9/541 719/328 |

* cited by examiner

VLAN TO SECURE COMMUNICATION BETWEEN VIRTUAL MACHINES AND IN A MULTI-TENANT PUBLIC DATA CENTER

CLAIM OF BENEFIT TO PRIOR APPLICATION

This application is a continuation of U.S. patent application Ser. No. 14/108,277, now issued as U.S. Pat. No. 9,294,524, filed Dec. 16, 2013. U.S. patent application Ser. No. 14/108,277, now issued as U.S. Pat. No. 9,294,524, is incorporated herein by reference.

BACKGROUND

Many current private networks use public datacenters to supplement their resources. For example, a private network may move virtual machines from the private network to a public datacenter when the resources of the private network are not great enough to implement as many virtual machines as are needed by the users of the services that the private network provides. In the existing art, communications between two virtual machines (implemented on a public datacenter by the command of a private network) are routed through the private network in order to keep the communications secure.

BRIEF SUMMARY

Some embodiments provide a method of setting up communications between virtual machines (VMs) on a public (i.e., multi-tenant) datacenter in response to commands of a network controller of a private network. In some embodiments, the administrator of the private network (e.g., a company's enterprise network) uses resources of a multi-tenant datacenter to implement virtual machines previously implemented in the private network (or in some embodiments virtual machines not previously implemented in the private network). The private network controller sends a query to the network controller of the multi-tenant datacenter and receives a response that identifies the type of network controller that manages the multi-tenant datacenter. When the controller of the private network is programmed to use application programming interfaces (APIs) of the multi-tenant datacenter network controller, the private network controller commands the network controller of the multi-tenant datacenter to set up one or more VLANs on the multi-tenant datacenter. The multi-tenant datacenter network controller then configures its host machines and VMs to implement the VLAN specified by the private network controller (e.g., by adding VLAN ID tags to packets sent between virtual machines). The VLANs allow secure communications between the virtual machines operating in the multi-tenant datacenter based on the commands from the network controller of the private network.

On the other hand, when the private network controller is not programmed to use application programming interfaces (APIs) of the network controller in the multi-tenant datacenter, the forwarding elements of the multi-tenant datacenter send traffic between the VMs through the private network (e.g., through a gateway or other forwarding element of the private network).

In some embodiments the private network controller commands the network controller of the multi-tenant datacenter to set up a private VLAN (PVLAN) in order to enable secure communications between the VMs on the private network. A PVLAN includes a primary VLAN and multiple secondary VLANs. In some embodiments, the forwarding elements on the hosts of the multi-tenant datacenter use some or all of the secondary VLANs to facilitate secure communications between communities of virtual machines. In some embodiments, the forwarding elements allow communications between VMs within each community (e.g., using VLAN ID tags to identify packets within the community), but do not allow communication between virtual machines in different communities using the VLAN IDs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method of setting up communications between virtual machines implemented on a public (i.e., multi-tenant) datacenter at the command of a network controller of a private network. In some embodiments, the administrator of the private network (e.g., a company's enterprise network) uses resources of a public datacenter to implement virtual machines previously implemented in the private network. For example, the public datacenter could be VMware's vCloud hybrid service, or some other vendor's public datacenter. The private network controller sends a query to the network controller of the public datacenter and receives a response that identifies the type of network controller that manages the public datacenter. When the controller of the private network is programmed to use application programming interfaces (APIs) of the public datacenter network controller, the private network controller commands the network controller of the public datacenter to set up one or more VLANs on the public datacenter. The public datacenter network controller then configures its host machines and VMs to implement the VLAN specified by the private network controller (e.g., by adding VLAN ID tags to packets sent between virtual machines). The VLANs allow secure communications between the virtual machines operating in the public datacenter based on the commands from the network controller of the private network. A combined private network/public datacenter used to implement virtual machines and VLANs is sometimes referred to a hybrid cloud system.

Figure 1:
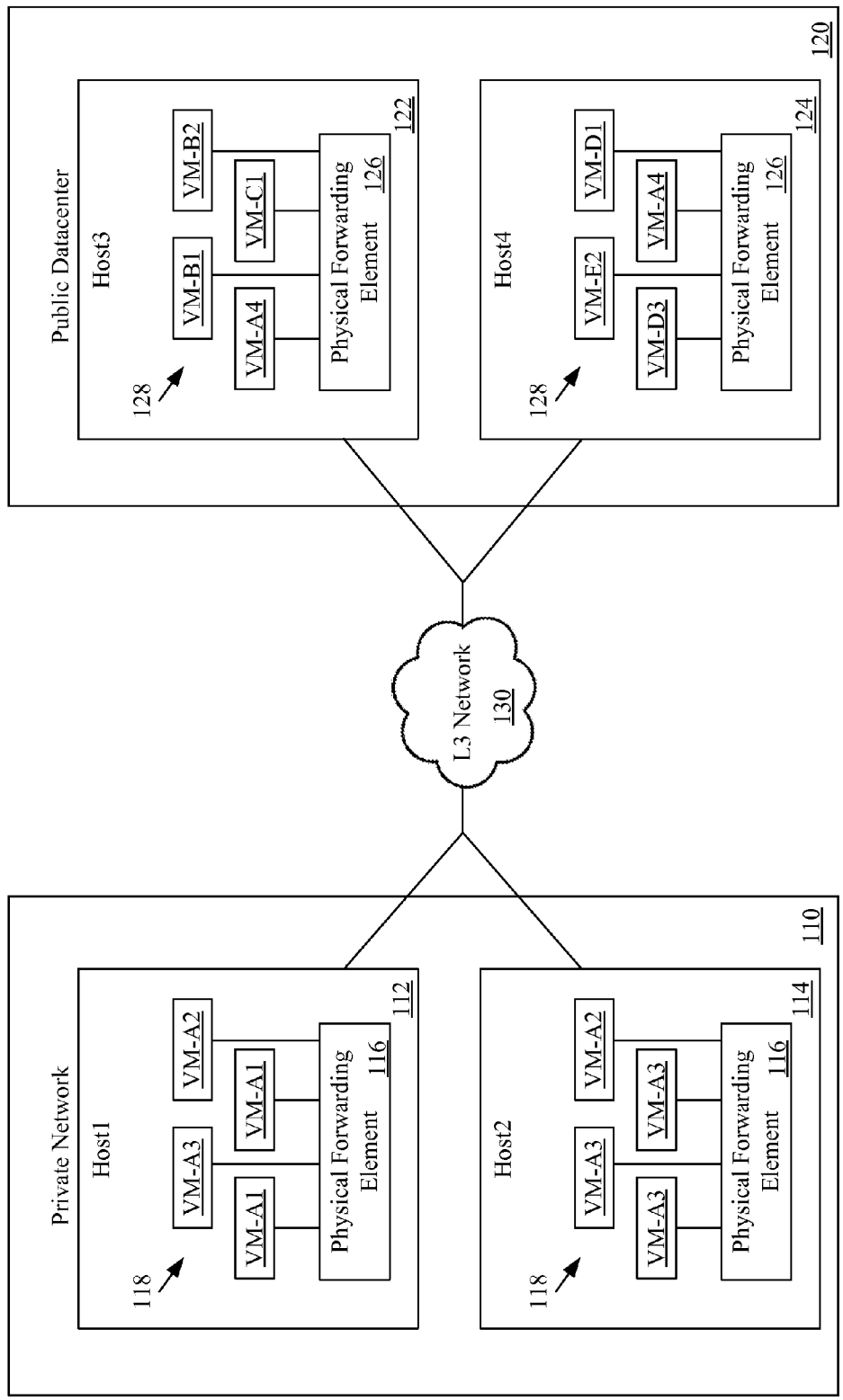
FIG. 1 illustrates an environment under which communications between virtual machines is implemented.

FIG. 1 illustrates an environment within which such communications between virtual machines are implemented. This environment includes a private network 110 with host machines (hosts) 112 and 114. The hosts 112 and 114 are computers that implement physical forwarding elements 116 (e.g., virtual switches or other software forwarding elements) and virtual machines 118. The physical forwarding elements 116 pass traffic between virtual machines 118 and other systems (e.g., other virtual machines on the private network, outside machines, etc.). The hosts 112 and 114 of the private network 110 connect through an L3 network 130 (e.g., the Internet) to a public datacenter 120. The public datacenter 120 includes hosts 122 and 124. The hosts 122 and 124 implement physical forwarding elements 126 and virtual machines 128. The physical forwarding elements 126 pass signals between various virtual machines 128 and between virtual machines 128 and other systems (e.g., hosts or gateways on the private network, other outside machines, etc.).

As shown in FIG. 1, the host machines 112 and 114 in the private network 110 host virtual machines belonging to several different networks (e.g., different VLANs, indicated by the numbers A1, A2, and A3). However, in this private network, all of the virtual machines have the same owner (e.g., the company that operates and owns the private network 110). In the public datacenter 120, however, company A's VMs co-exist alongside those of other tenants B, C, D, and E. As such, the multi-tenant datacenter uses various techniques to maintain isolation between VMs of the different tenants (e.g., using VLANs). In the illustrated example, and in other figures described herein, the virtual machines are labeled with "VM-" followed by a letter representing the specific tenant (e.g., an "A" for all the VMs 118 on the private network 110 and "A-E" for VMs 128 on the public datacenter 120) and a number representing a particular VLAN of the tenant. Thus VM-A1 is a virtual machine that resides on VLAN1 of tenant A.

While this figure illustrates only two hosts in each of the private network 110 and the public datacenter 120, one of ordinary skill in the art will recognize that each of these physical infrastructures may include numerous host machines (e.g., the public datacenter might have hundreds or thousands of host machines arranged in racks, with the tenant that also runs the private datacenter only having virtual machines operating on a few of these hosts). Furthermore, while the figure illustrates communication directly between the host machines and the L3 network 130, one of ordinary skill will recognize that each of the two physical infrastructures 110 and 120 may include gateway or other forwarding elements that handle communication between the external network and internal forwarding elements.

In some embodiments, the owner of a private network wants to move virtual machines already operating in the private network into the public datacenter (e.g., in order to expand network capacity without adding new physical infrastructure to the private network). To move these VMs to the public datacenter in some embodiments, a private network controller sends a command to a network controller of the public datacenter instructing the public datacenter controller to implement the virtual machines on its hosts. In some embodiments, in addition to or instead of moving virtual machines from the private network to the public datacenter, the private network controller commands the public datacenter network controller to implement new virtual machines on its hosts (i.e., VMs that are not moved from the private network).

Once the virtual machines are operational in the public datacenter, they may need to communicate securely with each other, but without exposing the traffic to other tenants in the datacenter or to other networks owned by the same tenant in the datacenter (e.g., networks A1 and A2 in FIG. 1). One possible secure communication path between two VMs in the public datacenter is for the traffic to be sent by the local physical forwarding element for the source VM to the private network (e.g., to a host or gateway in the private network), and then back to a local physical forwarding element for the destination VM in the public datacenter. However, sending traffic back through the private network results in delay and latency issues for communications between VMs in the public datacenter. Accordingly, in some embodiments, the private network controller commands the network controller of the public datacenter to set up a VLAN between the virtual machines set up in response to the commands of the private network controller.

In some embodiments the private network controller commands the network controller of the multi-tenant datacenter to set up a private VLAN (PVLAN) in order to enable secure communications between the VMs on the private network. A PVLAN includes a primary VLAN and multiple secondary VLANs. In some embodiments, the forwarding elements on the hosts of the multi-tenant datacenter use some or all of the secondary VLANs to facilitate secure communications between communities of virtual machines. In some embodiments, the forwarding elements allow communications between VMs within each community (e.g., using VLAN ID tags to identify packets within the community), but do not allow communication between virtual machines in different communities using the VLAN IDs.

The above introduces discussion of the movement of virtual machines from a private network to a public datacenter. Several more detailed examples are described below. Section I describes moving virtual machines to a public datacenter. Section II describes implementing virtual local area networks and private virtual local area networks. Section III describes sending packets from a VLAN to an outside address. Section IV describes an electronic system that implements the methods and programs of some embodiments.

I. Moving Virtual Machines to a Public Datacenter

Figure 2:
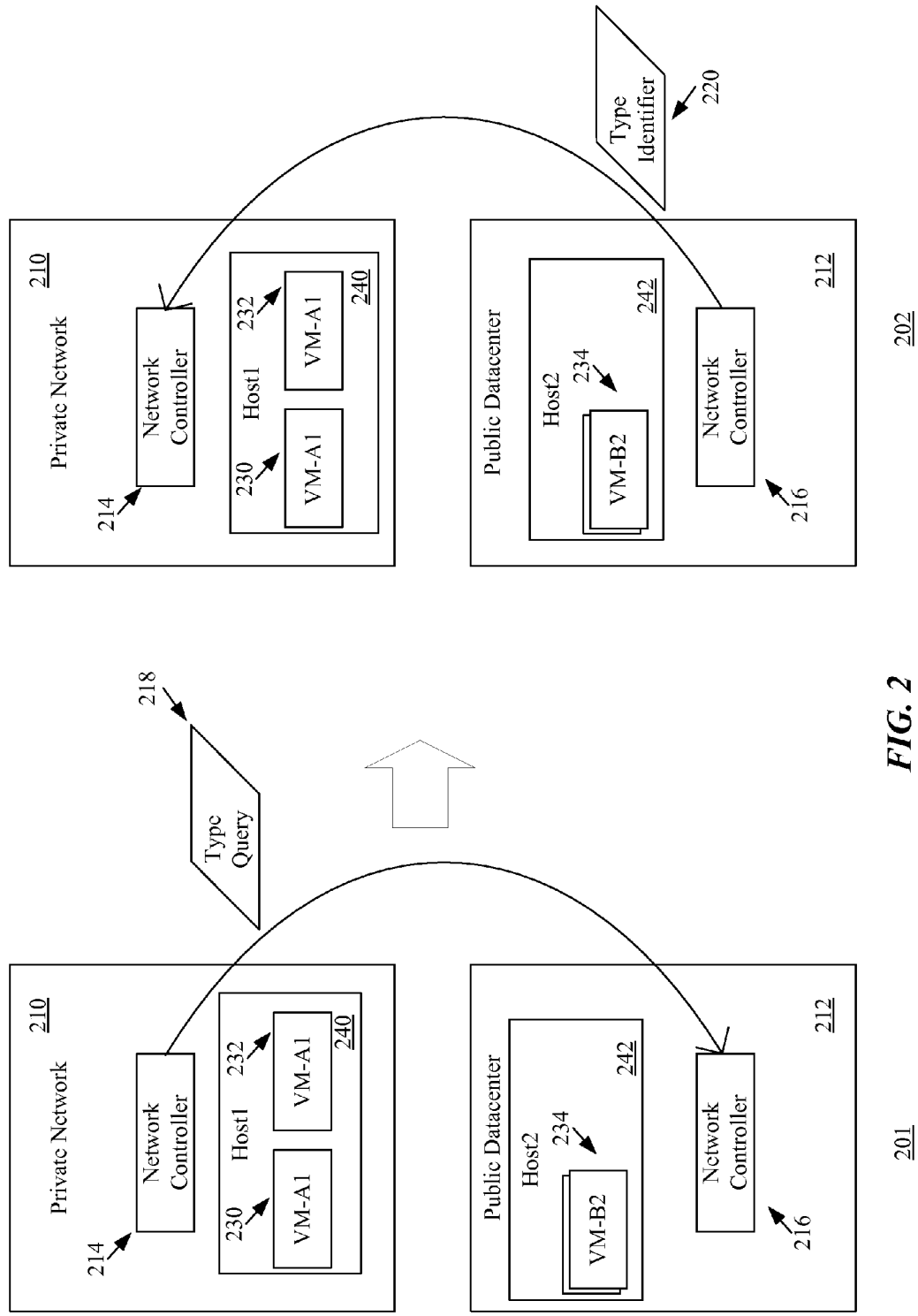
FIG. 2 illustrates initial stages in which the private network controller determines whether the network controller of the public datacenter is capable of setting up a VLAN.
Figure 3:
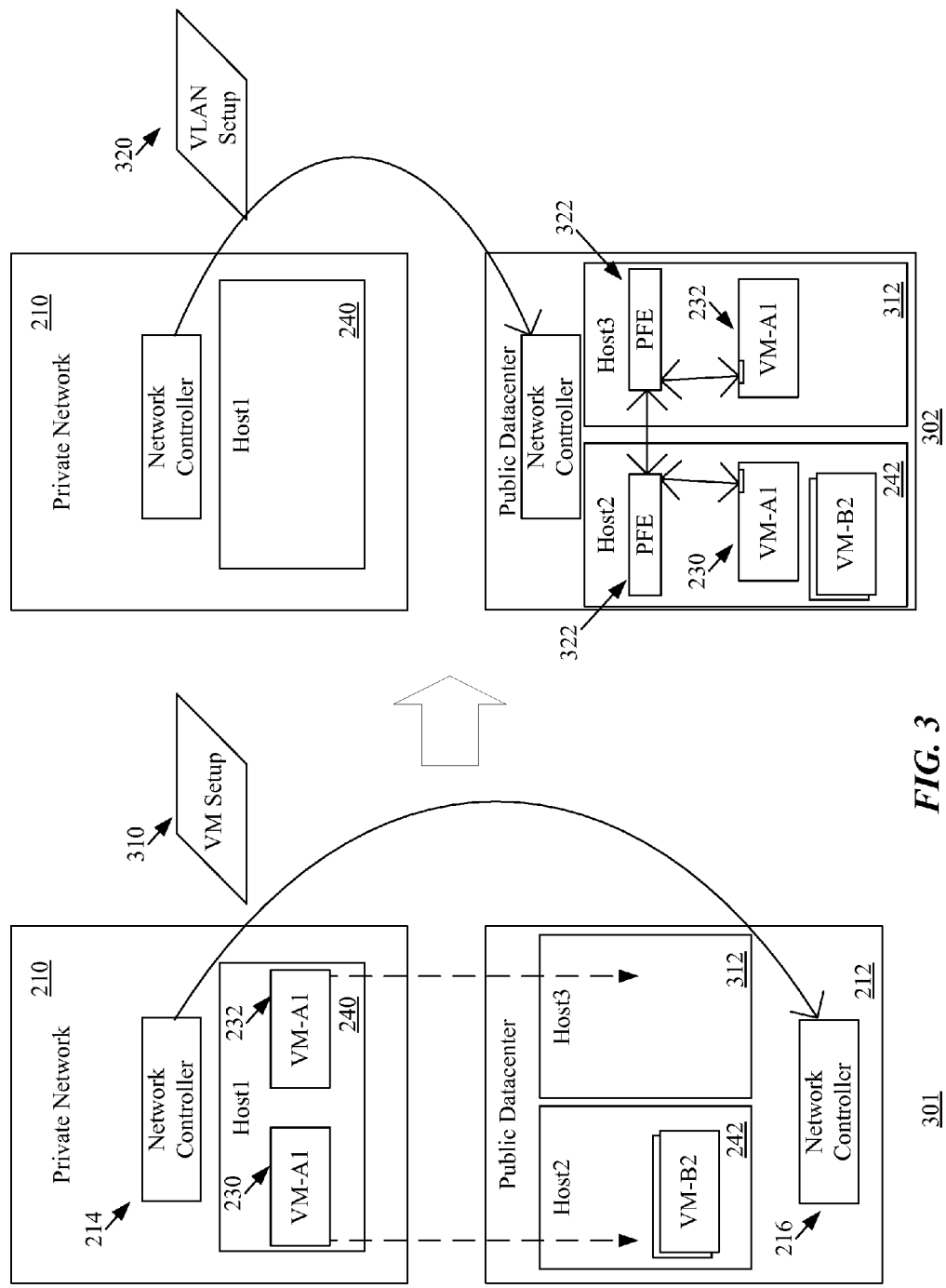
FIG. 3 illustrates moving virtual machines from a host on the private network to hosts on the public datacenter and setting up a VLAN for the virtual machines on the public datacenter.
Figure 4:
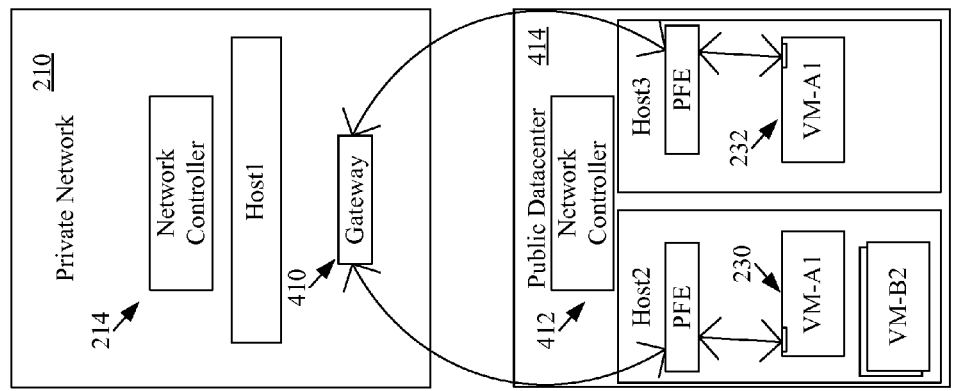
FIG. 4 illustrates how a private network controller sets up virtual machines and communications between virtual machines when it cannot command the network controller of the public datacenter to set up a VLAN.
Figure 4:
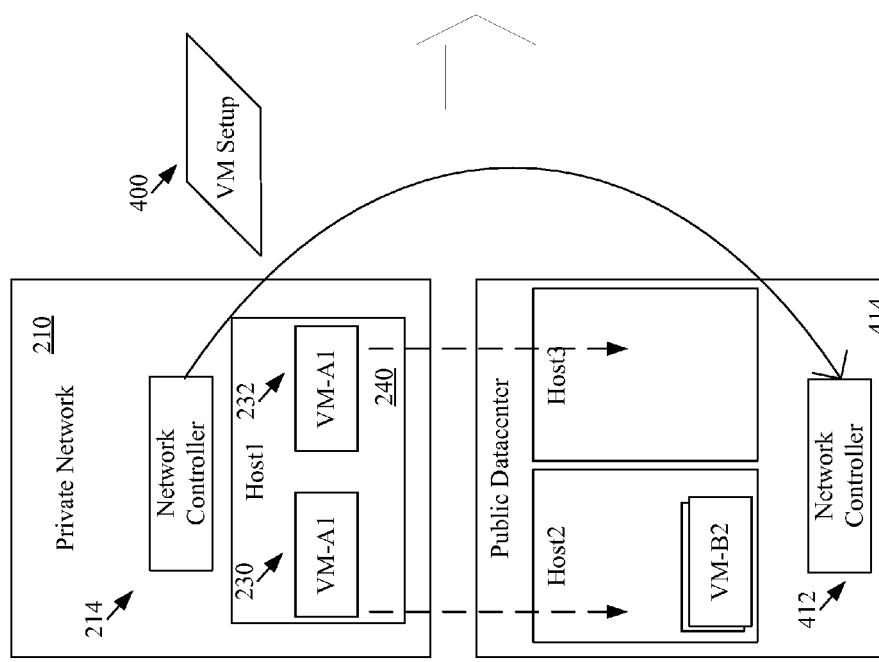

As mentioned, some embodiments provide techniques for moving virtual machines located on a private network (e.g., a company's enterprise network) to a public datacenter, while maintaining secure communications between the VMs. FIGS. 2-4 illustrate various stages of a private network controller commanding a network controller of a public datacenter to set up virtual machines on a public datacenter according to some embodiments. FIG. 2 illustrates initial stages in which the private network controller determines whether the network controller of the public datacenter is capable of implementing a VLAN on hosts of the public datacenter in response to commands by the private network controller. FIGS. 3 and 4 illustrate the transfer of virtual machines from a private network to a public datacenter and alternate communications paths for the virtual machines depending on the response the private network controller receives in FIG. 2.

FIG. 2 illustrates private network 210, public datacenter 212, a network controller 214 of the private network 210, a network controller 216 of the public datacenter 212, virtual machines 230, 232, and 234, host machine 240 on the private network 210 and host machine 242 on the public datacenter 212. As in the previous figure, this example only illustrates a small number of the numerous hosts that may be present in both the private network 210 and public datacenter 212. In the illustrated example, and in other figures described herein, the virtual machines are labeled with "VM-" followed by a letter representing the specific tenant.

The private network 210 includes networked hardware and software set up to serve the needs of a private entity (e.g., a corporation or an individual) by implementing and/or controlling virtual machines (e.g., virtual machines 230 and 232). In some embodiments, the network controller 214 of the private network 210 is able to transfer virtual machines (e.g., VMs 230 and 232) to the public datacenter 212. The public datacenter 212 includes networked hardware and software set up to implement virtual machines for multiple customers (e.g., virtual machine 234 for customer "B" and, as shown in FIG. 3, described later in this section, virtual machines 230 and 232 transferred from private network 210 for customer "A").

In some cases, when a virtual machine is transferred from a private network to a public datacenter (or initiated on the public datacenter by command of the private network controller), the public datacenter implements the virtual machine on hosts (e.g., host 242) that may already implement other virtual machines (e.g., virtual machine 234) for the same tenant or for other tenants. In other cases, the virtual machines are implemented on hosts that are not already implementing other virtual machines.

In stage 201, the private network controller 214 of the private network 210 sends a type query 218 to the network controller 216 of the public datacenter 212. The private network controller 214 of some embodiments sends the query as preparation for transferring virtual machines 230 and 232 from host 240 of the private network 210 to the public datacenter 212 (e.g., to be implemented by host 242 of the public datacenter or other hosts of the public datacenter).

The type query 218 of some embodiments is a request to the network controller 216 of the public datacenter to identify its network controller type (e.g., the network controller software run by the network controller 216). This network controller may be, e.g., a VMware VCenter controller, a Nicira NVP controller, or other network controllers provided by other vendors etc. In other embodiments, the type query is a query as to whether the network controller (and the physical forwarding elements managed by the network controller in the public datacenter) support private VLANs. That is, the type query is a yes/no question as to whether this particular feature is supported.

While shown as a direct communication between the network controllers 214 and 216, one of ordinary skill in the art will recognize that the query 218 may consist of one or more packets that could follow a variety of paths. For one, the query packet(s) may pass through an intervening network (e.g., L3 network 130), as well as various forwarding elements. In some embodiments, this controller communication takes the same paths as data traffic (i.e., VM-to-VM traffic) between the two physical networks 210 and 212, while in other embodiments the control data travels over different paths.

In stage 202, the network controller 216 responds with a type identifier message 220 to the private network controller 214 of the private network 210. The type identifier 220 identifies the type of the network controller 216 (e.g., the software and version of the network controller). In other embodiments, the type identifier message 220 simply responds to the query by indicating whether the network controller (or the forwarding elements managed by the network controller) supports private VLANs (PVLANs).

When the network controller 216 (or its managed physical forwarding elements) supports PVLANs, by using application programming interfaces (APIs) of the network controller 216, the network controller 214 can command the network controller 216 to set up such PVLANs within the public datacenter. In some embodiments, when the private network controller 214 recognizes the type of the network controller 216 as a type that is able to set up PVLANs, the private network controller 214 moves the virtual machines 230 and 232 to the public datacenter 212 and commands the network controller 214 to set up a PVLAN to allow the virtual machines 230 and 232 to communicate securely within the public datacenter 212 without passing their communications back through the private network 210.

FIG. 3 illustrates moving virtual machines from a host on the private network to hosts on the public datacenter and setting up a VLAN for the virtual machines on the public datacenter. This figure demonstrates the behavior of the network controller 214 of some embodiments when the network controller 216 is of a type known to support PVLANs and provides APIs that the network controller 214 is programmed to use (or when the network controller 216 responds in the affirmative that it supports PVLANs).

Working together, the network controller 214 and the public datacenter controller 212 move the virtual machines 230 and 232 from the private network to the public datacenter. In some embodiments, the virtual machines 230 and 232 are moved by implementing them on hosts of the public datacenter while ceasing to implement them on hosts of the private network. As shown, the private network controller 214 sends VM setup commands 310 to the public datacenter controller 212. The VM setup commands 310 include all commands necessary to instruct the network controller 216 of the public datacenter 212 to implement virtual machines 230 and 232 on hosts of the public datacenter 212. The VM setup commands 310 further include all data necessary to implement the virtual machines (e.g., all necessary settings, user data, program code, etc. for the virtual machines 230 and 232). In response to the VM setup commands 310, the public datacenter 212 then implements the virtual machines 230 and 232. In addition, in some embodiments the private network 210 removes the virtual machines 230 and 232. The stage 302 illustrates that the relocation of the virtual machines has been completed.

In the illustrated examples, the private network controllers implement the movement of virtual machines from a private network to a public datacenter. In some embodiments, the private network controller takes the actions to move the VMs based on a cloud management platform of the private network. In some embodiments, the cloud management platform may command the movement of virtual machines based on a dynamic scheduling algorithm (e.g., an algorithm of a dynamic resource scheduler (DRS)) and/or based on specific commands (e.g., manual determination) by a network administrator (e.g., a person authorized to use command functions of the network).

In the illustrated example, the public datacenter 212 implements the virtual machine 230 on host 242 and the virtual machine 232 on host 312. However, in some cases, the network controller 216 of a public datacenter 212 commands one host to implement two or more relocated virtual machines rather than commanding two or more separate hosts to implement the virtual machines (in some cases, more than two virtual machines may be moved from the private network to the public datacenter). In some cases, the relocated virtual machines may be implemented on multiple different hosts in the public datacenter, with some of the hosts operating more than one of the virtual machines.

In stage 302, the private network controller 214 sends VLAN setup commands 320 to the network controller 216 of the public datacenter 212. The network controller 216 of the public datacenter 212 then commands the physical forwarding elements 322 of the host machines 242 and 312 to implement the specified VLAN that allows the virtual machines 230 and 232 to communicate securely with each other through the physical forwarding elements 322 of the host machines 242 and 312. In some embodiments, the host machines 242 and 312 implement the VLAN by adding VLAN tags (e.g., IEEE 802.1Q headers) to packets sent between the virtual machines of the VLAN. The VLAN tags of some embodiments allow the physical forwarding elements to distinguish packets of the VLAN from packets that are not packets of the VLAN.

In some embodiments, as described in further detail in the sections below, the VLAN setup command 320 specifies one or more secondary VLANs (in a PVLAN setup) to use for communications between the VMs. The tenant A that operates the private network 210 may be allocated a single primary VLAN in the public datacenter, and may use various secondary VLANs in order to implement multiple secure networks within that single primary VLAN. In this case, only the two virtual machines 230 and 232 which communicate with each other are relocated to the public datacenter. In more complicated relocations of virtual machines, different groups of virtual machines might use different secondary VLANs to communicate with each other. In some embodiments, the VLAN setup command 320 specifies the different secondary VLANs and which machines connect to which secondary VLANs (e.g., using isolated and community ports, further described in section II).

FIG. 3 illustrates the behavior of the private network controller 214 when the network controller 216 of the public datacenter 212 has the ability to set up PVLANs within the public datacenter and provides APIs known to the private network controller 214. In contrast, FIG. 4 illustrates the behavior of the private network controller 214 and the ensuing setup when a public datacenter network controller 412 does not have the ability to use PVLANs or the private network controller 214 does not have the ability to use the APIs provided by the network controller 412 to set up a PVLAN.

FIG. 4 includes a gateway 410 in the private network 210 and network controller 412 in public datacenter 414. In stage 401, the private network controller 214 relocates the virtual machines 230 and 232 from the private network 210 to the public datacenter 414. In some embodiments, this is accomplished via the same setup command as in the example of FIG. 3, in which various data regarding the VMs is sent to the network controller 412, enabling the public datacenter network controller 412 to create these virtual machines on hosts within the datacenter.

Stage 402 illustrates the communication path required for traffic between the two VMs 230 and 232 in this situation. Rather than a direct connection (e.g., a tunnel) between the two physical forwarding elements to which the two VMs connect, the forwarding element at the source VM directs the traffic to the private network 210 (e.g., to the gateway 410 located in the private network). In some embodiments, the traffic also passes through a different gateway in the public datacenter before being sent to the gateway 410.

As mentioned above, in this example the private network controller 214 is unable to command the public datacenter network controller 412 to set up a PVLAN (e.g., because the feature is unsupported in the public datacenter). Therefore, the private network controller 214 commands the public datacenter network controller to set up a different communication path for traffic between the virtual machines 230 and 232 on the public datacenter 404. In the absence of a PVLAN, in order to ensure secure communications between virtual machines 230 and 232, the network controller 214 commands the physical forwarding elements on the hosts of the public datacenter 414 to forward traffic sent from one of the virtual machines 230 and 232 to the other of these virtual machines through a forwarding element in the private network (e.g., the gateway 410).

Accordingly, in the illustrated embodiment of FIG. 4, unlike the PVLAN communications path of FIG. 3, the communications path in FIG. 4 forwards all communications between the virtual machines 230 and 232 through the gateway 410 of the private network 210. Although the illustrated embodiment forwards the communications between the virtual machines 230 and 232 through a gateway 410, other embodiments forward communications between the virtual machines through other forwarding elements of the private network 210 (e.g., a physical forwarding element implemented on a host machine of the private network 210, etc.).

Figure 5:
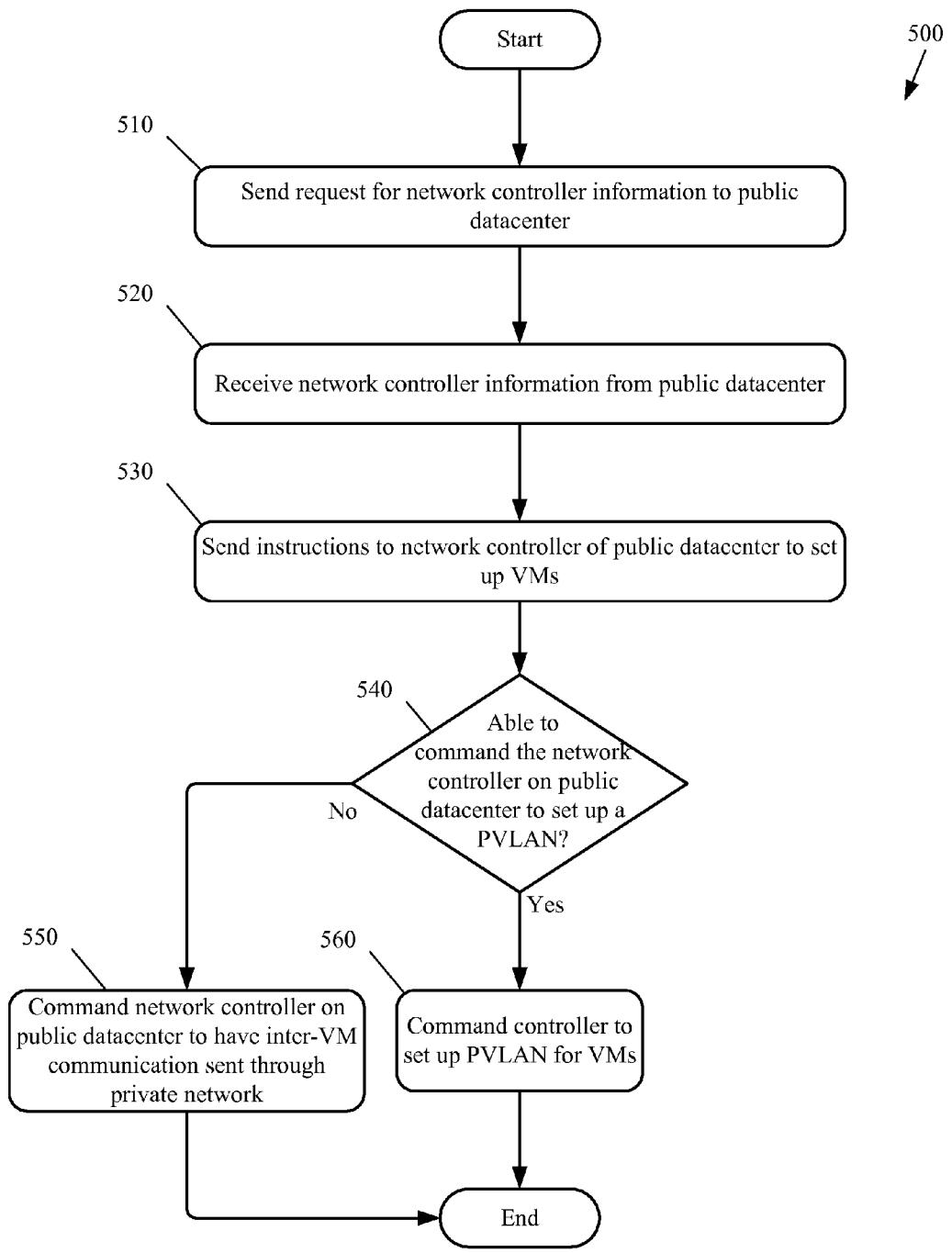
FIG. 5 conceptually illustrates a process of some embodiments for a network controller of a private network to set up VM on a public datacenter and set up communications between the VMs.

FIG. 5 conceptually illustrates a process 500 of some embodiments performed by a network controller of a private network to set up a set of VMs in a public datacenter and set up communications between the VMs. The process 500 sends (at 510) a request for network controller information to the public datacenter (e.g., as illustrated in FIG. 2, above). In some embodiments, the request for network controller information is a query to determine what type of network controller the public data center uses, or whether the network controller and/or forwarding elements in the public datacenter support the use of private VLANs.

The process 500 receives (at 520) network controller information from the public datacenter (e.g., as illustrated in FIG. 2, above). For example, the network controller could be a particular version of a network controller from VMware, Nicira, other vendors, etc. The network controller of the private network uses this identifying information to determine what APIs to use to send instructions to the network controller of the public datacenter to set up VMs on the hosts of the public datacenter (e.g., VMs moved from the private network). In addition, this network controller information may also include an indication as to whether the public datacenter controller and forwarding elements support private VLANs.

The process 500 sends (at 530) instructions to the network controller of the public datacenter to set up virtual machines in the public datacenter. In some embodiments, the virtual machines are transferred from the private network and/or initially set up on the public datacenter. As indicated above, these instructions may include various data regarding the virtual machines, such as settings, user data, program code, etc. Stage 301 of FIG. 3 and stage 401 of FIG. 4 illustrate examples of sending such instructions to the public datacenter network controller.

In some cases, the virtual machines that are set up on the public datacenter need to communicate securely with each other, or with other virtual machines already set up in the public datacenter. The virtual machines may exist on several different VLANs in the private network which provide secure communications within the VLANs, while only one primary VLAN is available to the tenant in the public datacenter. In some embodiments, these communications may be secured through the use of either a private VLAN (that uses multiple secondary VLANs) in the public datacenter, or by forwarding VM-to-VM communications through the private network.

Accordingly, the process 500 uses the identifying information received from the public datacenter controller to determine (at 540) whether the network controller of the private network is able to command the network controller of the public datacenter to set up a private VLAN. In order for the network controller of the private network to be able to command the network controller of the public datacenter to set up a PVLAN, two factors must be present in the network controllers of the private network and the public datacenter. First, the network controller of the public datacenter must be programmed to be capable of setting up a PVLAN on the hosts of the public datacenter (and the forwarding elements of the public datacenter must have the ability to implement PVLANs). Second, the network controller of the private network must be programmed to use APIs of the network controller of the public datacenter to command the network controller of the public datacenter to set up the PVLAN.

Figure 7:
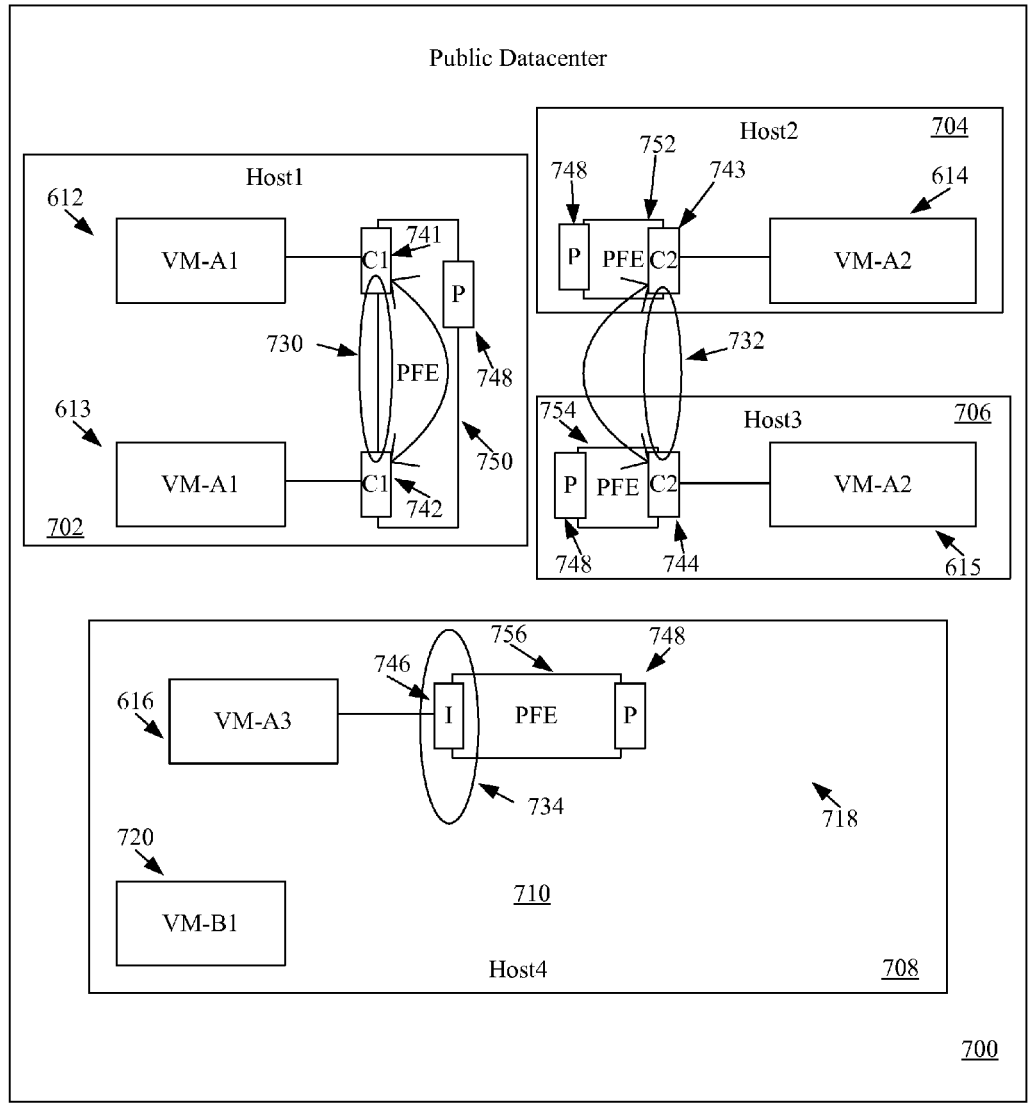
FIG. 7 conceptually illustrates a public datacenter with a PVLAN of some embodiments.

When the process 500 determines that the network controller of the private network is able to command the network controller of the public datacenter to set up a PVLAN, the process 500 commands (at 560) the network controller of the public datacenter to set up a PVLAN (e.g., as illustrated in FIG. 7, described in section II) for the virtual machines created in the public datacenter in operation 530 (in some embodiments the PVLAN is also implemented to include other VMs set up later or already existing in the public datacenter). The PVLAN implemented by the forwarding elements of the public datacenter allow the virtual machines to securely communicate by sending packets between the virtual machines without sending the packets through the private network (e.g., as shown in FIG. 3). The process 500 then ends.

When the process 500 determines (at 540) that the network controller of the private network is not able to command the network controller of the public datacenter to set up a PVLAN, the process 500 commands (at 550) the network controller of the public datacenter to have inter-VM communications sent through the private network (e.g., as shown in FIG. 4). The process 500 then ends.

II. Mapping VLANs to PVLANs

Figure 6:
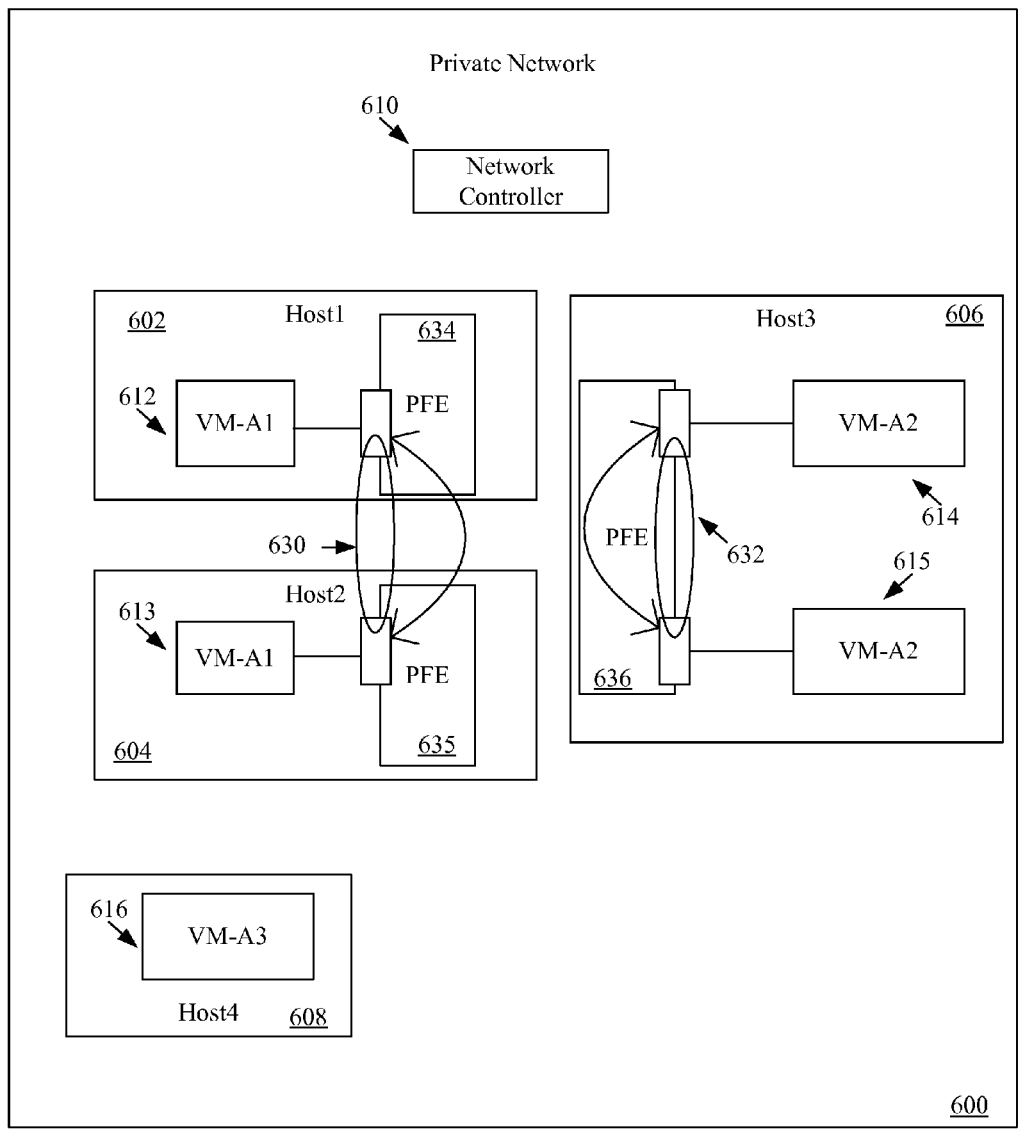
FIG. 6 illustrates VLANs connecting virtual machines implemented by hosts of a private network.

In some embodiments, groups of virtual machines are segregated within a private network (e.g., enterprise network) by using VLANs implemented by the physical forwarding elements of the private network. The network controller in the private network, in some embodiments, maintains the state of these VLANs and configures the physical forwarding elements to implement them. When the private network controller relocates some or all of the virtual machines to a public datacenter, this segregation of traffic should be maintained. However, in some embodiments, the multi-tenant public datacenter only allocates a single primary VLAN to the tenant (i.e., the operator of the private network). Accordingly, the private network controller commands the public datacenter network controller to implement various secondary VLANs within this primary VLAN in order to adequately secure the traffic between the different groups of relocated virtual machines. FIG. 6 illustrates the use of VLANs to connect virtual machines across host machines in a private network, while FIG. 7 illustrates the same virtual machines after they have been transferred to a public datacenter and the use of primary and secondary VLANs in the public datacenter to maintain communication security.

As mentioned above, in the illustrated examples, the private network controllers implement the movement of virtual machines from a private network to a public datacenter. In some embodiments, the private network controller takes the actions to move the VMs based on a cloud management platform of the private network. In some embodiments, the cloud management platform may command the movement of virtual machines based on a dynamic scheduling algorithm (e.g., an algorithm of a dynamic resource scheduler (DRS)) and/or based on specific commands (e.g., manual determination) by a network administrator (e.g., a person authorized to use command functions of the network).

FIG. 6 illustrates a private network 600, with hosts 602-608 and network controller 610. Two virtual machines 612 and 613 reside on hosts 602 and 604, respectively, and communicate through VLAN 630. In some embodiments, this VLAN 630 is implemented by configuring physical forwarding elements 634 and 635 that operate on the hosts 602 and 604 (e.g., by configuring ports of these physical forwarding elements 634 and 635). The host 606 implements two virtual machines 614 and 615, which communicate through VLAN 632. This traffic can only be sent through the physical forwarding element 636 (e.g., a virtual switch) that operates in the host 606, and to which the two VMs 614 and 615 connect. A fifth VM 616 operates on the host 608, and is not connected to any of the previously mentioned VLANs, as it does not communicate with the other VMs (though may communicate with entities external to the network). In some embodiments, a virtual machine that is not connected to any other virtual machines by a VLAN (e.g., the fifth VM 616) is still assigned to a default VLAN.

In some embodiments, the VMs attach to ports of the physical forwarding elements, and these ports implement the VLANs by adding VLAN tags to packets (e.g., Ethernet frames) sent to that port. The forwarding elements can then only deliver the packets to ports that match that tag (such that, e.g., a packet sent from the VM 614 will not be delivered to the port to which the VM 612 attaches).

In some embodiments, the network controller of the private network moves virtual machines from the private network to a public datacenter (e.g., as shown in FIGS. 3 and 4). In some such embodiments, the network controller of the private network commands a network controller of the public datacenter to configure the physical forwarding elements of the public datacenter, to which the relocated VMs connect, to implement a private virtual local area network (PVLAN) so as to maintain the isolation existing in the private network. The PVLAN of some embodiments includes a primary VLAN and a plurality of secondary VLANs. In some embodiments, for each VLAN in the private network for which at least one of the VMs is moved to the public datacenter, the instructions sent to the public datacenter network controller map the VLAN to a secondary VLAN to implement in the public datacenter.

FIG. 7 conceptually illustrates a public datacenter in which a PVLAN of some embodiments is implemented, to correspond to the VLANs implemented in the private network shown in FIG. 6. This figure illustrates a public datacenter 700 with host machines 702-708. The VMs 612-616 (the virtual machines transferred from the private network 600 of FIG. 6) reside on the hosts 702-708, while VM 720 (belonging to a different tenant of the multi-tenant datacenter) also resides on the host 708 with VM 616. The physical forwarding elements 750-756 (e.g., software forwarding elements) on the hosts 702-708 implement a primary VLAN 710 common to all of the virtual machines 612-616 of the particular tenant of the public datacenter (the tenant whose machines were transferred over from that tenant's private network). In the illustrated example, and in other figures described herein, the virtual machines are labeled with "VM-" followed by a letter representing the tenant (e.g., an "A" for VMs 612-616 and a "B" for VM 720) and a number representing a particular VLAN of the tenant. Thus VM-A1 is a virtual machine that resides on VLAN1 of tenant A.

The physical forwarding elements 750-756 on the hosts 702-708 further implement multiple secondary VLANs 730-734 to selectively allow communication between various sets of virtual machines for tenant A. In the illustrated example, the virtual machines 612 and 613 operate on the host 702, and the physical forwarding element 750 on the host 702 implements community ports 741 and 742 for a first secondary VLAN 730. The community ports 741 and 742 are a logical construct that the physical forwarding element on the host 702 uses to determine that communication between the VMs 612 and 613 (i.e., VMs within a given community) should be allowed to communicate with each other. Packets from the VM 612 to the other VM 613 (or vice versa) on the same secondary VLAN are tagged with an ID of the secondary VLAN 730 and therefore the physical forwarding element 750 allows the packets to pass between the VMs 612 and 613.

The VMs 612 and 613 both operate on a common host 702. However, the PVLANs of some embodiments also connect virtual machines implemented on different hosts of the public datacenter 700. For example, VMs 614 and 615 operate on the hosts 704 and 706, respectively. These VMs each attach to community ports 743 and 744 on the physical forwarding elements 752-754 of their respective hosts. The community ports 743 and 744 are logical constructs that the physical forwarding elements 752-754 of the hosts 704 and 706 use to determine that communication between the VMs 614 and 615 (i.e., VMs within that community) should be allowed to communicate with each other (e.g., through physical forwarding elements 752-754 of the hosts 704 and 706). Packets from VM 614 to VM 615 (and vice versa) are tagged with an ID of the secondary VLAN 732 by the physical forwarding element 752 or 754 to which the source machine connects and therefore the physical forwarding elements 752-754 allow the packets to pass between the VMs 614 and 615.

In addition to community ports, the physical forwarding elements of some embodiments implement PVLANs with isolated ports. For example, because the VM 616 does not communicate with any other VMs, it attaches to an isolated port 746 on its physical forwarding element 756. Because the port 746 is an isolated port, the physical forwarding element 756 on the host 708 does not allow VM 616 to communicate with other virtual machines using secondary VLAN 734. In some embodiments, multiple different VMs may connect to isolated ports, which use the same secondary VLAN tag but do not allow communications between isolated ports.

In some embodiments, the physical forwarding elements 750-756 also implement promiscuous ports 748 for a primary VLAN. These ports allow communication with any entities that connect to the primary VLAN. In this example, the promiscuous ports 748 allow any of the VMs 612-616 to communicate with external entities (e.g., unknown client devices sending requests to the VMs on the public datacenter, as might occur if the VMs are used to host web servers). However, because VM 720 is not on the primary VLAN 710 or any of the secondary VLANs associated with that primary VLAN, it cannot communicate through a promiscuous port 748 for tenant A's primary VLAN.

In a public datacenter setup such as that shown above, with a tenant having one primary VLAN and multiple secondary VLANs (or a different setup), the tenant VMs may need to communicate with either associated VMs in the private network or external entities (e.g., clients accessing the tenant's web servers). As mentioned, the promiscuous ports of the private VLAN allow for external communication in some embodiments. When communicating outside the primary VLAN, some embodiments replace the VLAN tag with a different VLAN tag.

Figure 8:
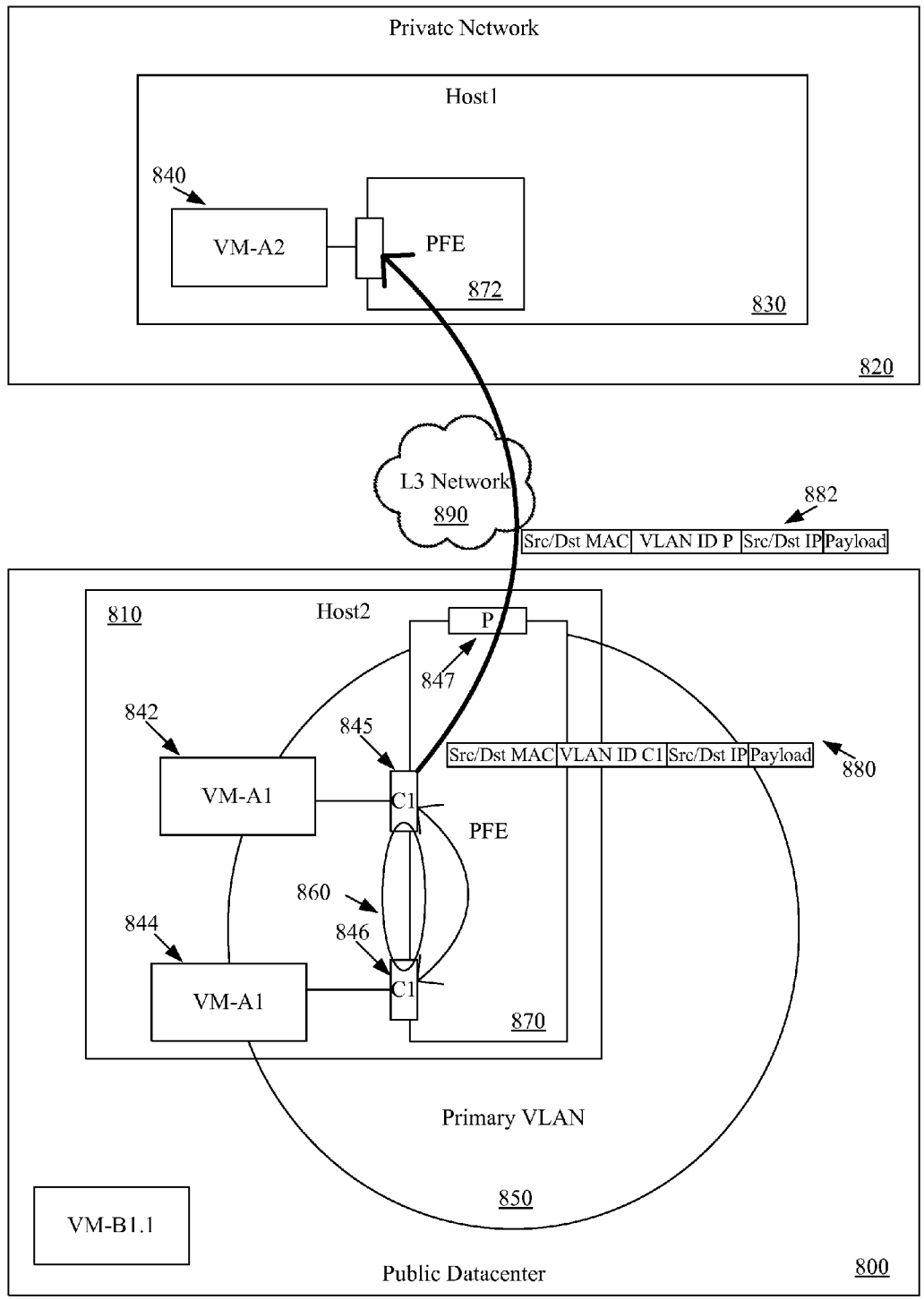
FIG. 8 conceptually illustrates an embodiment in which a physical forwarding element translates addresses of packets from the primary VLAN to addresses outside the primary VLAN.

FIG. 8 conceptually illustrates an example in which a physical forwarding element translates a packet sent from a VM attached to a community port of a secondary VLAN of a primary VLAN to a VM outside the primary VLAN (specifically, in this case, in the tenant's own private network). The figure illustrates public datacenter 800, host 810 located in the public datacenter 800, private network 820, and host 830 located in the private network 820. The host 810 in the public datacenter hosts VMs 842 and 844, while the host 830 in the private network hosts VM 840, which is attached to a port of PFE 872. The VMs 842 and 844 both attach to community ports 845-846 of the PFE 870 associated with the same secondary VLAN 860, which is part of primary VLAN 850, and therefore these VMs can communicate with each other. The PFEs 870 and 872 communicate through an L3 network 890 (e.g., the Internet).

As mentioned above, the PFEs of some embodiments implement the VLANs by inserting a VLAN ID tag into packets sent between VMs on the VLAN. When the VM 842 sends a packet to the VM 844, the port 845 to which VM 842 inserts the tag for the secondary VLAN 860, and therefore the port 846 to which VM 844 attaches is allowed to deliver this packet to the VM 844 (in some embodiments, the port 846 removes the VLAN tag, in other embodiments, the VLAN tag remains part of the packet).

Similarly, when the VM 842 sends a data packet 880 to VM 840 through PFE 870, the L3 network 890, and PFE 872, the data packet 880 initially includes packet fields such as source and destination MAC addresses, source and destination IP addresses, and a data payload (in some embodiments, the packet fields are in the order given above, in other embodiments, the packet headers are in other orders). The term "packet" is used here as well as throughout this application to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc. In some embodiments, packets may have other fields in addition to or instead of one or more of the fields explicitly identified above. Upon reaching the port 845 of the physical forwarding element 870, the physical forwarding element 870 inserts the secondary VLAN tag (here, "VLAN ID C1") into the packet 880 in some embodiments. However, when the packet is sent out of the physical forwarding element 870 through promiscuous port 847, this VLAN ID is replaced with a new VLAN ID, represented here by "VLAN ID P", because the packet is being sent outside the PVLAN 860 boundary as data packet 882.

While in the illustrated embodiment, the local PFE 870 in the host replaces the VLAN tag from the packet, in other embodiments this tag is replaced at a gateway that connects to the intervening L3 network 890 between the public datacenter and the private network and acts as a boundary of the PVLAN 860. For incoming packets, the translation works in a similar way in some embodiments. As the packet enters the primary VLAN, through the promiscuous port 847, the physical forwarding element 870 makes sure that the VLAN tag is the VLAN tag (represented here by "VLAN ID P") of the primary VLAN 850 and port 845 (to which the VM 842 attaches) is a paired secondary in order to allow delivery of the packet to that VM 842.

In the above described embodiments, the network controller of the private network identifies the type (e.g., software and version thereof, etc.) of the network controller of the public datacenter and uses APIs of the network controller of the public datacenter to command the network controller to set up a PVLAN on hosts of the public datacenter. However, in some embodiments, the network controller of the private network, instead of or in addition to identifying the type of the network controller of the public datacenter, identifies the type of physical forwarding element used by the hosts of the public datacenter. Then, if the physical forwarding element is a type that the private network controller is programmed to command, the private network controller uses APIs of the physical forwarding elements to command the physical forwarding elements to implement the VLANs/PVLANs described above.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
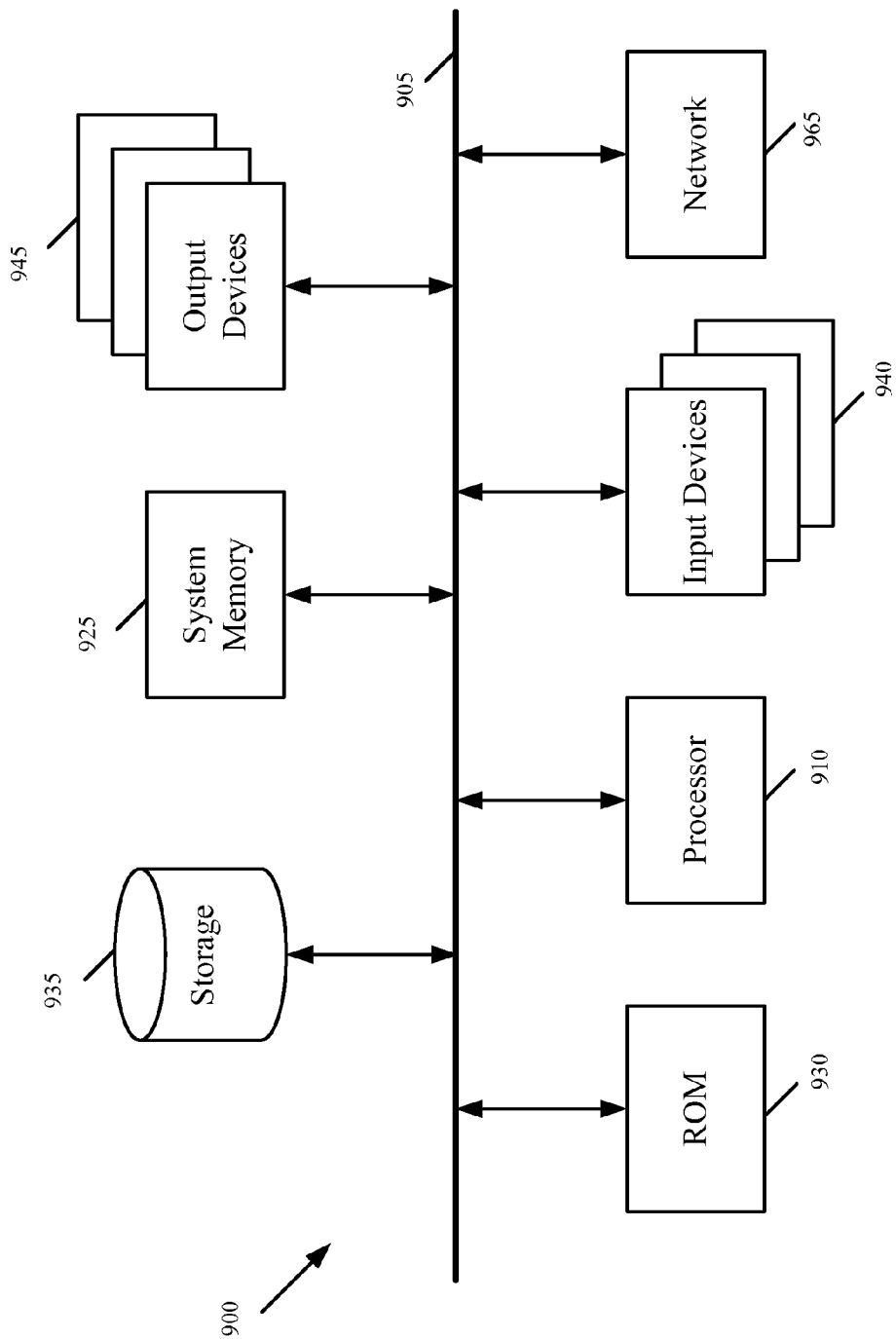
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, host machine, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "host", "machine", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, FIG. 5 conceptually illustrates a process. The specific operations of the process may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A method comprising:
at a first network controller of a private network of a private datacenter comprising a first set of virtual machines (VMs):
in response to a command to create a second set of one or more VMs in a public datacenter, commanding a second network controller of the public datacenter to create the second set of VMs in the public datacenter, wherein the first network controller configures a set of forwarding elements in the private network for communicating with the second set of VMs;
communicating with the second network controller of the public datacenter to determine whether the second network controller is a type that includes application programming interfaces (APIs) to set up a virtual local area network (VLAN) for the second set of VMs; and
after determining that the second network controller is a type that includes APIs to set up the VLAN for the second set of VMs, using the APIs to command the second network controller to set up the VLAN in the public datacenter for the second set of VMs, such that the second set of VMs communicate securely with each other through the VLAN without forwarding their communications to each other through the private network, the second set of VMs communicating with each other through the private network when the second controller is not a type that includes APIs to set up the VLAN.

2. The method of claim 1, wherein determining whether the second network controller is a type that includes the APIs to set up the VLAN comprises:
sending a query from the first network controller to the second network controller; and
receiving an identifying message from the second network controller at the first network controller.

3. The method of claim 1, wherein the VLAN is a private VLAN (PVLAN).

4. The method of claim 3, wherein the PVLAN comprises a primary VLAN and a plurality of secondary VLANs.

5. The method of claim 1, wherein prior to the first network controller commanding the second network controller to create the second set of VMs, the second set of VMs are implemented on the private network, wherein creating the second set of VMs in the public datacenter moves the second set of VMs from the private network to the public datacenter.

6. The method of claim 1, wherein the first network controller commands the second network controller of the public datacenter to create the second set of one or more VMs in response to a set of commands received from a cloud management platform to create the second set of VMs.

7. The method of claim 6, wherein the set of commands received from the cloud management platform are generated in response to one of a dynamic scheduling algorithm and a command received from a network administrator.

8. A non-transitory machine readable medium storing a program for execution by at least one processing unit of a network controller computer of a private network of a private datacenter comprising a first set of virtual machines (VMs), the program comprising sets of instructions for:
  in response to a command to create a second set of one or more VMs in a public datacenter, commanding a network controller that manages a network of the public datacenter to create the second set of VMs in the public datacenter;
  configuring a set of forwarding elements in the private network for communicating with the second set of VMs;
  identifying whether the type of the public datacenter network controller is one of a pre-selected set of network controller types that include application programming interfaces (APIs) to set up a virtual local area network (VLAN) for the second set of virtual machines (VMs); and
  after identifying that the type of the public datacenter network controller is one of the pre-selected set of network controller types, using the APIs to command the public datacenter network controller to set up the VLAN for the second set of VMs, wherein a set of host machines of the public datacenter implement the VLAN to send data communications between the second set of VMs through the VLAN without forwarding their data communications to each other through the private network,
  wherein when the type of the public datacenter network controller is not one of the pre-selected set of network controller types, all data communications between the second set of VMs passes through the private network.

9. The non-transitory machine readable medium of claim 8, wherein the pre-selected set of network controller types comprises a set of network controller types with APIs for which the program has instructions to utilize.

10. The non-transitory machine readable medium of claim 8, wherein the VLAN is a private VLAN (PVLAN) that comprises a primary VLAN and a plurality of secondary VLANs.

11. The non-transitory machine readable medium of claim 8, wherein the set of instructions for identifying whether the network controller that manages the network of the public datacenter is a type of one of a pre-selected set of network controller types that include the APIs to set up the VLAN comprises sets of instructions for:
  sending a query to the network controller in the public datacenter; and
  receiving an identifying message from the public datacenter network controller.

12. A non-transitory machine readable medium storing a first network controller for execution by at least one processing unit of a network controller computer in a private network of a private datacenter comprising a first set of virtual machines (VMs), the first network controller comprising sets of instructions for:
  in response to a command to create a second set of one or more VMs in a public datacenter, commanding a second network controller of the public datacenter to create the second set of VMs in the public datacenter;
  configuring a set of forwarding elements in the private network for communicating with the second set of VMs;
  communicating with the second network controller of the public datacenter to determine whether the second network controller is a type that includes application programming interfaces (APIs) to set up a virtual local area network (VLAN) for the second set of VMs; and
  after determining that the second network controller is a type that includes APIs to set up the VLAN for the second set of VMs, using the APIs to command the second network controller to set up the VLAN in the public datacenter for the second set of VMs, such that the second set of VMs communicate securely with each other through the VLAN without forwarding their communications to each other through the private network, the second set of VMs communicating with each other through the private network when the second controller is not a type that includes APIs to set up the VLAN.

13. The non-transitory machine readable medium of claim 12, wherein the set of instructions for determining whether the second network controller is a type that includes the APIs to set up the VLAN comprises sets of instructions for:
  sending a query from the first network controller to the second network controller; and
  receiving an identifying message from the second network controller at the first network controller.

14. The non-transitory machine readable medium of claim 12, wherein prior to the first network controller commanding the second network controller to create the second set of VMs, the second set of VMs are implemented on the private network, wherein creating the second set of VMs in the public datacenter moves the second set of VMs from the private network to the public datacenter.

15. The non-transitory machine readable medium of claim 12, wherein the first network controller commands the second network controller of the public datacenter to create the second set of one or more VMs in response to a set of commands received from a cloud management platform to create the second set of VMs.

* * * * *